US012161988B2

(12) United States Patent
Kobayashi

(10) Patent No.: US 12,161,988 B2
(45) Date of Patent: *Dec. 10, 2024

(54) POWDER, METHOD OF PRODUCING POWDER AND ADSORPTION APPARATUS

(71) Applicant: HOYA CORPORATION, Tokyo (JP)

(72) Inventor: Shintaro Kobayashi, Saitama (JP)

(73) Assignee: HOYA CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/200,096

(22) Filed: May 22, 2023

(65) Prior Publication Data
US 2023/0294068 A1    Sep. 21, 2023

Related U.S. Application Data

(60) Continuation of application No. 17/474,356, filed on Sep. 14, 2021, now Pat. No. 11,701,633, which is a (Continued)

(30) Foreign Application Priority Data

Sep. 28, 2009   (JP) ................. 2009-223355

(51) Int. Cl.
*B01J 20/28*     (2006.01)
*B01J 20/04*     (2006.01)
(Continued)

(52) U.S. Cl.
CPC ....... *B01J 20/048* (2013.01); *B01J 20/28004* (2013.01); *B01J 20/28011* (2013.01);
(Continued)

(58) Field of Classification Search
CPC ................ B01J 20/048; B01J 20/28004; B01J 20/28011; B01J 20/28016; B01J 20/2803; (Continued)

(56) References Cited

U.S. PATENT DOCUMENTS 5,037,543 A    8/1991 Maejima et al.
5,360,544 A    11/1994 Nakaso et al.
(Continued)

FOREIGN PATENT DOCUMENTS

JP    03-218460    9/1991
JP    4-118047     4/1992
(Continued)

OTHER PUBLICATIONS

PTO Machine translation of JP-2009057228-A Mar. 19, 2009.
(Continued)

*Primary Examiner* — Benjamin L Lebron
(74) *Attorney, Agent, or Firm* — Greenblum & Bernstein, P.L.C.

(57) ABSTRACT

The present invention provides that powder is mainly constituted from secondary particles of hydroxyapatite. The secondary particles are obtained by drying a slurry containing primary particles of hydroxyapatite and aggregates thereof and granulating the primary particles and the aggregates. A bulk density of the powder is 0.65 g/mL or more and a specific surface area of the secondary particles is 70 m²/g or more. The powder of the present invention has high strength and is capable of exhibiting superior adsorption capability when it is used for an adsorbent an adsorption apparatus has.

4 Claims, 7 Drawing Sheets

Ex.1: Dried powder 2,000-fold magnification 400-fold magnification

Com.Ex.1: Dried powder 2,000-fold magnification 400-fold magnification

Related U.S. Application Data division of application No. 16/549,199, filed on Aug. 23, 2019, now Pat. No. 11,278,864, which is a continuation of application No. 15/281,665, filed on Sep. 30, 2016, now Pat. No. 10,710,050, which is a division of application No. 13/497,635, filed as application No. PCT/JP2010/066350 on Sep. 22, 2010, now abandoned.

(51) Int. Cl.
  *B01J 20/281* (2006.01)
  *B01J 20/282* (2006.01)
  *B01J 20/30* (2006.01)
  *C01B 25/32* (2006.01)

(52) U.S. Cl.
  CPC ..... *B01J 20/28016* (2013.01); *B01J 20/2803* (2013.01); *B01J 20/28057* (2013.01); *B01J 20/28059* (2013.01); *B01J 20/28069* (2013.01); *B01J 20/28078* (2013.01); *B01J 20/281* (2013.01); *B01J 20/282* (2013.01); *B01J 20/3021* (2013.01); *B01J 20/3028* (2013.01); *B01J 20/3078* (2013.01); *B01J 20/3085* (2013.01); *C01B 25/322* (2013.01); *C01B 25/327* (2013.01); *B01J 20/28019* (2013.01); *B01J 2220/52* (2013.01); *B01J 2220/54* (2013.01); *B01J 2220/56* (2013.01); *C01P 2004/53* (2013.01); *C01P 2004/61* (2013.01); *C01P 2006/12* (2013.01); *Y10T 428/2982* (2015.01)

(58) Field of Classification Search
  CPC ............ B01J 20/28057; B01J 20/28059; B01J 20/28069; B01J 20/28078; B01J 20/281; B01J 20/282; B01J 20/3021; B01J 20/3028; B01J 20/3078; B01J 20/3085; B01J 20/28019; B01J 2220/52; B01J 2220/54; B01J 2220/56; C01B 25/322; C01B 25/327; C01P 2004/63; C01P 2004/61; C01P 2006/12

See application file for complete search history.

(56) References Cited

U.S. PATENT DOCUMENTS

| | | | |
|---|---|---|---|
| 6,013,591 | A | 1/2000 | Ying et al. |
| 6,210,715 | B1 | 4/2001 | Starling et al. |
| 6,306,297 | B1 | 10/2001 | Ichitsuka et al. |
| 10,710,050 | B2 | 7/2020 | Kobayashi |
| 11,161,090 | B2 | 11/2021 | Kobayashi |
| 11,278,864 | B2 | 3/2022 | Kobayashi |
| 11,701,633 | B2 | 7/2023 | Kobayashi |
| 2003/0214062 | A1 | 11/2003 | Ishikawa |
| 2006/0021941 | A1 | 2/2006 | Boschetti et al. |
| 2007/0181478 | A1 | 8/2007 | Kobayashi et al. |
| 2007/0183955 | A1 | 8/2007 | Godber et al. |
| 2008/0152909 | A1 | 6/2008 | Kyotami |
| 2009/0060814 | A1 | 3/2009 | Ishikawa et al. |
| 2010/0247665 | A1 | 9/2010 | Takahashi |
| 2012/0285880 | A1 | 11/2012 | Kobayashi |
| 2020/0122115 | A1 | 4/2020 | Kobayashi |

FOREIGN PATENT DOCUMENTS

| | | |
|---|---|---|
| JP | 2001-089114 | 4/2001 |
| JP | 2009057228 A | 3/2009 |
| WO | 2009066644 | 5/2009 |

OTHER PUBLICATIONS

PTO Translation No. 13-5490 of Japan Patent No. 2009035465 Feb. 19, 2009.

PTO Translation No. 13-5501 of Japan Patent No. 2004224620 Aug. 12, 2004.

PTO Translation No. 13-5520 of Japan Patent No. 6263415 Sep. 20, 1994.

Search report from International Application No. PCT/JP2010/066350, mail date is Dec. 21, 2010.

English translation of JP 4-118047. Apr. 12, 2012. Applicant IDS dated 20120705 from great great grandparent case U.S. Appl. No. 13/497,635.

Omura, N., et al., "Wet jet milling of $Al_2O_3$ slurries", Journal of the European Ceramic Society, 27, pp. 733-737 (Year: 2007).

Ex.1: Dried powder 2,000-fold magnification 400-fold magnification

Com.Ex.1: Dried powder 2,000-fold magnification 400-fold magnification

Ex.1: Dried powder 100,000-fold magnification 50,000-fold magnification

Com.Ex.1: Dried powder 100,000-fold magnification 50,000-fold magnification

Ex.2

Com. Ex.2

POWDER, METHOD OF PRODUCING POWDER AND ADSORPTION APPARATUS

CROSS REFERENCE TO RELATED APPLICATIONS

This is a Continuation of U.S. application Ser. No. 17/474,356 filed Sep. 14, 2021, which is a Divisional of U.S. application Ser. No. 16/549,199, filed Aug. 23, 2019, now U.S. Pat. No. 11,278,864, which is a Continuation of U.S. application Ser. No. 15/281,665, filed Sep. 30, 2016, now U.S. Pat. No. 10,710,050, which is a Divisional of U.S. application Ser. No. 13/497,635, filed Mar. 22, 2012, now abandoned, which is a U.S. National Stage of PCT/JP2010/066350, filed Sep. 22, 2010, which claims priority to JP Application No. 2009-223355, filed Sep. 28, 2009. The disclosure of each of the above-identified documents is incorporated herein by reference in its entirety.

TECHNICAL FIELD

The present invention relates to powder, a method of producing powder, and an adsorption apparatus.

RELATED ART

Hydroxyapatite has high biocompatibility, high safety and the like. For these reasons, in recent years, the hydroxyapatite has been used generally as a material for stationary phase of a chromatography which is used when a bio medicine such as an antibody and a vaccine is purified and isolated.

As described above, the hydroxyapatite is used as the material for stationary phase of the chromatography, which can be produced as follows.

First, a first liquid containing calcium hydroxide is mixed with a second liquid containing phosphoric acid to obtain a mixture. Then, the calcium hydroxide is reacted with the phosphoric acid with stirring the mixture to obtain a slurry containing primary particles of hydroxyapatite and aggregates thereof. Next, the slurry containing the primary particles and the aggregates thereof is dried. Then, the dried primary particles and aggregates are granulated to thereby obtain secondary particles (powder) of the hydroxyapatite.

Next, the powder is sintered to obtain sintered powder (hereinafter, referred to as "sintered powder"). The powder and the sintered powder are filled in a column (absorption apparatus) as a material for stationary phase (adsorbent) (see Patent Document 1).

In the reaction to obtain the hydroxyapatite by using such calcium hydroxide and phosphoric acid, by-products other than the hydroxyapatite are only water. Therefore, there is an advantage that no by-products remain in the formed powder and the sintered powder. Further, there is also an advantage that the reaction is controlled with ease by adjusting pH of the first liquid and the second liquid. This is because the reaction is an acid-base reaction.

However, in such a method, the calcium hydroxide has low solubility to the first liquid. Due to the fact, the reaction of the calcium hydroxide and phosphoric acid becomes a solid-liquid reaction. Therefore, the aggregates of the primary particles formed in the slurry are non-uniform in an agglomeration degree thereof.

If powder of hydroxyapatite is obtained by drying a slurry in a state of the non-uniform aggregates in such an agglomeration degree, there is a problem in that the powder cannot obtain sufficient strength due to a low bulk density of the powder. Further, when the powder is used as a material for stationary phase, there is also a problem in that the material for stationary phase cannot exhibit superior adsorption capability because a specific surface area of particles of the powder becomes low. In this regard, it is to be noted that a particle in this specification means each of particles (secondary particles) and powder in this specification means that a plurality of particles gathered together.

In particular, such problems are caused more conspicuously when powder of particles having a particle size of 10 μm or less is used for the material for stationary phase.

In order to solve the problems, there is known a method of obtaining spherical hydroxyapatite particles by spraying a slurry of hydroxyapatite into a plasma generation apparatus and then heating the sprayed slurry at a temperature of several thousand degree. However, in such a method, phosphoric acid is volatilized at a high temperature so that an amount of calcium becomes excess. Therefore, particles which have no apatite structure and do not have a constant composition are obtained. Such particles are not suitable as a material for stationary phase.

The Patent document 1 is JP-A 03-218460.

SUMMARY OF THE INVENTION

It is an object of the present invention to provide powder that has high strength and is capable of exhibiting excellent adsorption capability when it is used for an adsorbent used in an adsorption apparatus. Furthermore, it is another object of the present invention to provide a method of producing powder that can produce such powder and an adsorption apparatus that uses such powder as an adsorbent.

These objects are achieved by the present inventions (1) to (10) described below.

(1) Powder including hydroxyapatite, wherein the hydroxyapatite includes primary particles and secondary particles obtained by drying a slurry containing the primary particles and aggregates thereof and granulating the primary particles and the aggregates, and the powder comprising: mainly the secondary particles of the hydroxyapatite, wherein a bulk density of the powder is 0.65 g/mL or more and a specific surface area of the secondary particles is 70 m²/g or more.

The powder, which has the bulk density within such a range and the particles having the specific surface area within such a range, has high strength and are capable of exhibiting excellent adsorption capability when it is used for an adsorbent used in an adsorption apparatus.

(2) In the method described in the above-mentioned item (1), a sphericity of each of the secondary particles of the powder is in the range of 0.95 to 1.00.

When the powder including the particles having high sphericity is used as an adsorbent used in an adsorption apparatus, it is possible to improve a filling ratio of the powder into an adsorbent filling space of the adsorption apparatus.

(3) In the method described in the above-mentioned item (1) or (2), the secondary particles consisting the powder are classified so as to have an average particle size of 40±4 μm, wherein when a repose angle of the powder constituted of the classified secondary particles is measured, the repose angle is 27° or lower.

The powder having a low repose angle has a high flowability. Therefore, when the powder is used as an adsorbent used in an adsorption apparatus, it is possible to improve a filling efficiency of filling the powder into an adsorbent filling space of the adsorption apparatus.

(4) In the method described in the above-mentioned items (1) to (3), the powder is sintered at a temperature of 700° C. to obtain sintered powder having particles, and then the particles of the sintered powder are classified so as to have an average particle size of 40±4 μm, wherein when a compressive particle strength of the classified particles is measured, the compressive particle strength is over 9.0 MPa.

The powder comprised of the particles having the compressive particle strength within such a range can have sufficiently strength when it is used as an adsorbent used in an adsorption apparatus.

(5) In the method described in the above-mentioned items (1) to (4), the powder is sintered at a temperature of 700° C. to obtain sintered powder including particles each having a surface and micropores formed on the surface, wherein an average pore size of the micropores is 0.07 μm or less.

This makes it possible to reliably increase the specific surface area of the particles of the sintered powder.

(6) In the method described in the above-mentioned items (1) to (5), an average particle size of the secondary particles of the powder is in the range of 2 to 100 μm.

The powder of the particles having such an average particle size is preferably used to the present invention. When the powder is used for an adsorbent used in an adsorption apparatus, the powder exhibits high strength and excellent adsorption capability.

(7) A method of producing the powder described in the above-mentioned items (1) is provided. The method comprises: mixing a first liquid containing a calcium raw material with a second liquid containing a phosphoric raw material to obtain a mixture; reacting the calcium raw material with the phosphoric raw material with stirring the mixture to obtain the slurry containing the primary particles of the hydroxyapatite and the aggregates thereof; crushing the aggregates contained in the slurry physically to disperse crushed aggregates in the slurry; and drying the slurry and granulating the crushed aggregates to obtain the powder mainly constituted from the secondary particles of the hydroxyapatite.

This makes it possible to produce powder which is mainly constituted from the secondary particles of the hydroxyapatite. The bulk density of the powder is 0.65 g/mL or more and the specific surface area of the particles of the powder is 70 m$^2$/g or more.

(8) In the method described in the above-mentioned item (7), the crushing the aggregates physically is performed by a wet-type jet mill method in which the slurry is sprayed under a high pressure to obtain droplets of the slurry and the droplets are crashed to each other.

According to the method, it is possible to reliably crush the aggregates of the primary particles of the hydroxyapatite. Therefore, it is possible to reliably obtain powder which has a bulk density of 0.65 g/mL or more and particles having a specific surface area of 70 m$^2$/g or more.

(9) In the method described in the above-mentioned item (7) or (8), an average particle size of the crushed aggregates is 1 μm or less.

By falling the average particle size of the crushed aggregates within such an range, it is possible to reliably obtain powder which has a bulk density of 0.65 g/mL or more and particles having a specific surface area of 70 m$^2$/g or more.

(10) An adsorption apparatus provided with the powder described in the above-mentioned item (1) or sintered powder obtained by sintering the powder as an adsorbent.

This makes it possible to obtain an adsorption apparatus having high reliability.

In the present invention, it is possible to produce powder which is mainly constituted of hydroxyapatite by drying a slurry containing primary particles of the hydroxyapatite and then granulating the primary particles. The bulk density of the powder is 0.65 g/mL or more and the specific surface area of the particles is 70 m$^2$/g or more. Therefore, the powder has high strength and is capable of exhibiting excellent adsorption capability when it is used for an adsorbent used in an adsorption apparatus.

Further, according to the method of producing powder of the present invention, it is possible to reliably and easily produce the powder which has a bulk density of 0.65 g/mL or more and particles having a specific surface area of 70 m$^2$/g or more.

BRIEF DESCRIPTION OF THE DRAWINGS

FIG. 2(a) shows a particle size distribution curve of the aggregates before crushing.

BEST MODE FOR CARRYING OUT THE INVENTION

Hereinbelow, powder, a method of producing powder, and an adsorption apparatus according to the present invention will be described in detail with reference to their preferred embodiments.

First, prior to the description of the powder and the method of producing the powder according to the present invention, one example of an adsorption apparatus (separation apparatus) to be used in the present invention, namely the adsorption apparatus provided with the powder according to the present invention will be described.

Figure 1:
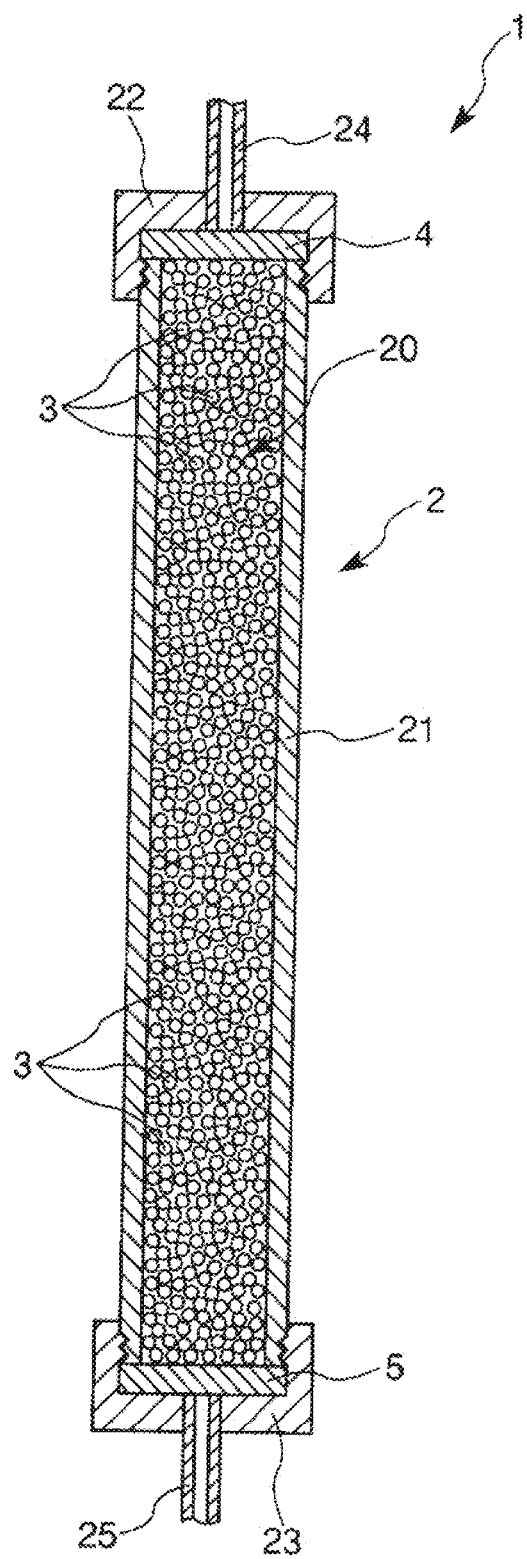
FIG. 1 is a sectional view which shows one example of an adsorption apparatus to be used in the present invention.

FIG. 1 is a sectional view which shows one example of an adsorption apparatus to be used in the present invention. It is to be noted that in the following description, the upper side and the lower side in FIG. 1 will be referred to as "inflow side" and "outflow side", respectively.

More specifically, the inflow side means a side from which liquids such as a sample solution (i.e., a liquid containing a sample) and an eluate are supplied into the adsorption apparatus to separate (purify) a target material to isolate, and the outflow side means a side located on the opposite side from the inflow side, that is, a side through which the liquids described above discharge out of the adsorption apparatus as a discharge liquid.

The adsorption apparatus 1 shown in FIG. 1, which is used for separating (isolating) the target material to isolate from the sample solution, includes a column 2, a granular adsorbent (filler) 3, and two filter members 4 and 5.

The column 2 is constituted from a column main body 21 and caps 22 and 23 to be attached to the inflow-side end and outflow-side end of the column main body 21, respectively.

The column main body 21 is formed from, for example, a cylindrical member. Examples of a constituent material of each of the parts (members) constituting the column 2 including the column main body 21 include various glass materials, various resin materials, various metal materials, and various ceramic materials and the like.

An opening of the column main body 21 provided on its inflow side is covered with the filter member 4, and in this state, the cap 22 is threadedly mounted on the inflow-side end of the column main body 21. Likewise, an opening of the column main body 21 provided on its outflow side is covered with the filter member 5, and in this state, the cap 23 is threadedly mounted on the outflow-side end of the column main body 21.

The column 2 having such a structure as described above has an adsorbent filling space 20 which is defined by the column main body 21 and the filter members 4 and 5, and at least a part of the adsorbent filling space 20 is filled with the adsorbent 3 (in this embodiment, almost the entire of the adsorbent filling space 20 is filled with the adsorbent 3).

A volumetric capacity of the adsorbent filling space 20 is appropriately set depending on the volume of a sample solution to be used. Such a volumetric capacity is not particularly limited, but is preferably in the range of about 0.1 to 100 mL, and more preferably in the range of about 1 to 50 mL per 1 mL of the sample solution.

By setting a size of the adsorbent filling space 20 to a value within the above range and by setting a size of the adsorbent 3 (which will be described later) to a value within a range as will be described later, it is possible to selectively isolate (purify) the target material to isolate (isolation material) from the sample solution. In other words, it is possible to reliably separate the isolation material such as a protein, an antibody and a vaccine from contaminating substances (foreign substances) other than the isolation material contained in the sample solution.

Further, liquid-tightness between the column main body 21 and the caps 22 and 23 is ensured by attaching the caps 22 and 23 to the openings of the column main body 21.

An inlet pipe 24 is liquid-tightly fixed to the cap 22 at substantially the center thereof, and an outlet pipe 25 is also liquid-tightly fixed to the cap 23 at substantially the center thereof. The liquids described above are supplied to the adsorbent filling space 20 through the inlet pipe 24 and the filter member 4. The liquids supplied to the adsorbent filling space 20 pass through gaps between particles of the adsorbent 3 and then discharge out of the column 2 through the filter member 5 and the outlet pipe 25. At this time, the isolation material and the contaminating substances other than the isolation material contained in the sample solution (sample) are separated from each other based on a difference in degree of adsorption of each of the isolation material and the contaminating substances with respect to the adsorbent 3 and a difference in degree of affinity of each of the isolation material and the contaminating substances with respect to an eluate.

Each of the filter members 4 and 5 has a function of preventing the adsorbent 3 from discharging out of the adsorbent filling space 20. Further, each of the filter members 4 and 5 is formed of a nonwoven fabric, a foam (a sponge-like porous body having communicating pores), a woven fabric, a mesh or the like, which is made of a synthetic resin such as polyurethane, polyvinyl alcohol, polypropylene, polyetherpolyamide, polyethylene terephthalate, or polybutylene terephthalate.

In the present embodiment, the adsorbent 3 used to the adsorption apparatus 1 is constituted of the powder of the present invention (secondary particles of hydroxyapatite) or sintered powder thereof.

The powder of present invention is obtained by drying a slurry containing primary particles of hydroxyapatite ($Ca_{10}(PO_4)_6(OH)_2$) and aggregates thereof, and granulating them. The particles of the powder are mainly constituted of the hydroxyapatite. It is characterized in that a bulk density of the powder is 0.65 g/mL or more and a specific surface area of the particles of the powder is 70 $m^2$/g or more. The hydroxyapatite is constituted from a chemically stable apatite structure. The hydroxyapatite is reliably used for the adsorbent which is provided with the adsorption apparatus. In this regard, it is intended that a Ca/P ratio of the hydroxyapatite is in the range of about 1.64 to 1.70.

When the sample solution is supplied into the adsorption apparatus 1 which has the adsorbent 3, the separation material contained in the sample solution is specifically adsorbed to the adsorbent 3 with inherent adsorbability (carrying power) of the separation material. Then, the separation material is separated from the contaminating substances other than the separation material contained in the sample solution according to a difference between the adsorbabilities of the separation material and contaminating substances with respect to the adsorbent 3, and thus is purified.

As described above, the bulk density of secondary particles (powder) of the hydroxyapatite may be 0.65 g/mL or more, and more preferably is in the range of about 0.70 to 0.95 g/mL or more. It is considered that the secondary particles having the bulk density within such a range have a heavy weight and gaps in the particle are lowered. In other words, the secondary particles can exhibit high strength because the secondary particles have a high filling density. Therefore, when the secondary particles are used as the adsorbent 3, it is possible to assist a long life of the adsorbent 3.

As described above, the specific surface area of the particles of the powder may be 70 $m^2$/g or more, and more preferably is in the range of about 75 to 100 $m^2$/g. The powder which is constituted of the particles having a high specific surface area within such a range makes it possible to increase an opportunity to make the isolation material contact with the adsorbent 3, thereby improving interaction between the isolation material and adsorbent 3, when the powder is used as the adsorbent 3. Therefore, the adsorbent 3 exhibits excellent adsorption capability with respect to the isolation material.

Here, particles of powder having a high bulk density, generally, have a low specific surface area. However, in the powder of the present invention, the bulk density is 0.65 g/mL or more and the specific surface area of the particles is 70 $m^2$/g or more. Thus, it becomes realizable to change the bulk density to a high bulk density and the specific surface area to a large specific surface area. It is considered to be caused by that both the bulk density of the powder and the specific surface area of the secondary particles are improved. The gaps in the secondary particle are reduced. In contrast, it is caused that fine pores and fine irregularities are formed in the vicinities of the surfaces of the secondary particles. It is considered that it is a main factor that the primary particles of the hydroxyapatite have a fine columnar shape, and the primary particles having the fine columnar shape complicatedly intervene with each other. On the other hand, gaps between the primary particles tend to be too large in primary particles having an indefinite shape, a plate shape and a spherical shape, so that it is difficult to maintain both the high bulk density and the large specific surface area.

Further, a form (shape) of the secondary particles, namely the adsorbent 3 is preferably a granulated shape (granular shape) as shown in FIG. 1. A sphericity of each of the secondary particles is preferably in the range of about 0.95 to 1.00 and more preferably in the range of about 0.97 to 1.00. When the secondary particles having a high sphericity as described above are used as the adsorbent 3, it is possible to improve the filling ratio of the adsorbent 3 into the adsorbent filling space 20.

A repose angle of such powder (secondary particles) is preferably 27° or lower and more preferably in the range of about 25 to 22° when such a repose angle is measured by using the secondary particles classified to an average particle size in the range of 40±4 μm. The secondary particles of the powder having such a low repose angle have high flowability and can assist the improvement of the operability (filling efficiency) when the secondary particles are filled into the adsorbent filling space 20 as the adsorbent 3.

Further, in sintered powder obtained by sintering the secondary particles, in the case where the secondary particles are sintered at a temperature of 700° C., an average pore size of micropores formed on the surface thereof is preferably 0.07 μm or less, and more preferably in the range of about 0.04 to 0.06 μm. Further, in the case where the secondary particles are sintered at the temperature of 400° C., the average pore size of the micropores is preferably 0.05 μm or less, and more preferably in the range of about 0.02 to 0.04 μm. By falling the average pore size of the micropores within the range, it is possible to reliably improve the specific surface area of the particles of the sintered powder.

Such secondary particles are classified to the average particle size in the range of 40±4 μm. A compressive particle strength (breaking strength) of the classified secondary particles (powder) is preferably 2.0 MPa or larger, and more preferably in the range of about 2.4 to 3.0 MPa.

Furthermore, in the case where the sintered powder obtained by sintering the secondary particles is classified to the average particle size in the range of 40±4 μm and the secondary particles are sintered at the temperature of 700° C., a compressive particle strength (breaking strength) of the classified particles of the sintered powder is preferably 9 MPa or larger, and more preferably in the range of about 9.4 to 10 MPa. Further, in the case where the secondary particles are sintered at the temperature of 400° C., a compressive particle strength of the particles is preferably 7.0 MPa or larger, and more preferably in the range of about 7.3 to 8.0 MPa.

The powder and the sintered powder each having the compressive particle strength within such a range have enough strength to be used for the adsorbent 3.

Further, an average particle size of the secondary particles is not particularly limited, but is preferably in the range of about 2 to 100 μm, more preferably in the range of about 2 to 80 μm, and even more preferably in the range of about 3 to 10 μm. The secondary particles having such an average particle size are reliably used for the present invention.

When the secondary particles are used for the adsorbent 3, the secondary particles can exhibit high strength and superior adsorption capability.

In this regard, in addition to the case where almost the entire of the adsorbent filling space 20 is filled with the adsorbent 3 as this embodiment, it is to be noted that the adsorbent filling space 20 of the adsorption apparatus of the present invention may be partially filled with the adsorbent 3 (e.g., a part of the adsorbent filling space 20 located on its one side where the inlet pipe 24 is provided may be filled with the adsorbent 3). In this case, the remaining part of the adsorbent filling space 20 may be filled with another adsorbent.

The powder of the present invention as described above can be produced by the method of producing the powder of the present invention as follows.

In the method of producing the powder of the present invention, a first liquid containing a calcium raw material such as calcium hydroxide as a calcium source is mixed with a second liquid containing a phosphate raw material such as phosphoric acid as a phosphoric source to obtain a mixture. The calcium raw material is reacted with the phosphate raw material with stirring the mixture to obtain a slurry containing primary particles of hydroxyapatite and aggregates thereof. These operations are referred to as a first step [S1]. Next, the aggregates contained in the slurry are crushed physically, so that the crushed aggregates are dispersed in the slurry. This operation is referred to as a second step [S2]. Finally, the slurry is dried, and then the crushed aggregates are granulated to obtain powder which is mainly constituted from secondary particles of the hydroxyapaite. This operation is referred to as a third step [S3].

Hereinafter, these steps will be described one after another.

In this regard, the following descriptions will be made on an example of that calcium hydroxide is used as the calcium source and phosphoric acid is used as the phosphoric source.

[S1: Step of Obtaining Slurry Containing Aggregates of Hydroxyapatite (First Step)]

In this step, a calcium hydroxide dispersion liquid containing calcium hydroxide (first liquid) is mixed with a phosphoric acid aqueous solution containing phosphoric acid (second liquid) to obtain the mixture. The calcium hydroxide is reacted with the phosphoric acid with stirring the mixture to obtain the slurry containing the aggregates of the primary particles of hydroxyapatite.

To be concrete, the phosphoric acid aqueous solution (second liquid) is dropped into the calcium hydroxide dispersion liquid (first liquid) in a vessel (not shown) while the calcium hydroxide dispersion liquid is stirred. By doing so, the mixture of the calcium hydroxide dispersion liquid and the phosphoric acid aqueous solution are prepared. Thereafter, the calcium hydroxide is reacted with the phosphoric acid in the mixture to obtain the slurry containing the aggregates of the hydroxyapatite.

In this process, used is a wet synthesis method that the phosphoric acid is used as a aqueous solution. This makes it possible to efficiently and easily synthesize hydroxyapatite (synthetic material) without use of an expensive production facility. Further, in the reaction of the calcium hydroxide and the phosphoric acid, by-products other than hydroxyapatite are only water. Therefore, there is an advantage that no by-products remain in the secondary particles of the hydroxyapatite and the sintered powder to be formed. Since this reaction is an acid-base reaction, there is also an advantage that the reaction is controlled with ease by adjusting pH of the calcium hydroxide dispersion liquid and the phosphoric acid aqueous solution.

By performing this reaction with stirring the mixture, it is possible to efficiently perform the reaction between the calcium hydroxide and the phosphoric acid. In other words, it is possible to improve efficiency of the reaction therebetween.

Furthermore, power for stirring (stirring power) the mixture containing the phosphoric acid aqueous solution and the calcium hydroxide dispersion liquid is not particularly limited to a specific power, but preferably in the range of about 0.75 to 2.0 W and more preferably in the range of about 0.925 to 1.85 W per 1 L of the mixture (slurry). By setting the stirring power to a value within the above range, it is possible to further improve the efficiency of the reaction between the calcium hydroxide and the phosphoric acid.

A content of the calcium hydroxide in the calcium hydroxide dispersion liquid is preferably in the range of about to 15 wt % and more preferably in the range of about 10 to 12 Wt %. A content of the phosphoric acid in the phosphoric acid aqueous solution is preferably in the range of about 10 to 25 wt % and more preferably in the range of about 15 to 20 Wt %. By setting the contents of the calcium hydroxide and the phosphoric acid to values within the above ranges, respectively, it is possible to efficiently react the calcium hydroxide and the phosphoric acid. Consequently, it is possible to reliably synthesize hydroxyapatite. This is because an opportunity of contacting between the calcium hydroxide and the phosphoric acid increases when the phosphoric acid aqueous solution is dropped into the calcium hydroxide dispersion liquid with stirring the calcium hydroxide dispersion liquid.

A rate of dropping the phosphoric acid aqueous solution into the calcium hydroxide dispersion liquid is preferably in the range of about 1 to 40 L/hr and more preferably in the range of about 3 to 30 L/hr. By mixing (adding) the phosphoric acid aqueous solution with (to) the calcium hydroxide dispersion liquid at such a dropping rate, it is possible to react calcium hydroxide with phosphoric acid under milder conditions.

In this case, the phosphoric acid aqueous solution is preferably dropped (added) into (to) the calcium hydroxide dispersion liquid for a length of time from about 5 to 32 hours, and more preferably for a length of time from about 6 to 30 hours. By dropping the phosphoric acid aqueous solution into the calcium hydroxide dispersion liquid in such a period of time to react the calcium hydroxide with the phosphoric acid, it is possible to sufficiently synthesize hydroxyapatite. It is to be noted that even if the time for dropping the phosphoric acid aqueous solution into the calcium hydroxide dispersion liquid is prolonged to exceed the above upper limit value, it cannot be expected that the reaction between the calcium hydroxide and the phosphoric acid will further proceed.

When the reaction between the calcium hydroxide and the phosphoric acid gradually proceeds, fine particles of hydroxyapatite (synthetic material) (hereinafter, simply referred to as "fine particles") are produced in the slurry. A chemical structure of such fine particles includes positively-charged parts and negatively-charged parts. Therefore, Van der Weals' forces (intermolecular force) are made between the positively-charged parts in the chemical structure of one fine particle of the fine particles and the negatively-charged parts in the chemical structure of the other fine particle of the fine particles. By this Van der Waals' forces, the one fine particle and the other fine particle adhere to each other to obtain a pre-aggregate. Then, in the surly, pre-aggregates are agglutinated to obtain aggregates of hydroxyapatite (synthetic material) (hereinafter, simply referred to as "aggregates"). The aggregates make a viscosity of the slurry increase gradually.

When the reaction between the calcium hydroxide and the phosphoric acid further proceeds, a ratio between the positively-charged parts and the negatively-charged parts of the fine particles contained in the slurry tends to approach each other. At this time, in the slurry, occurs a phenomenon that repulsive force occurring among the fine particles is reduced and the aggregation among fine particles further proceeds. As a result, aggregates having more a large particle size are formed.

[S2: Step of Dispersing Crushed Aggregates after Crushing Aggregates (Second Step)]

In this step, the aggregates of the primary particles of hydroxyapatite contained in the slurry obtained in the above step [S1] are physically crushed. Then, the crushed aggregates are dispersed in the slurry.

When the aggregates contained in the slurry are crushed, a particle size of each of the aggregates contained in the slurry is lowered. Due to the fact, in powder (secondary particles) of hydroxyapatite which will be obtained in a later step [S3], a bulk density thereof becomes 0.65 g/mL or more and a specific surface area of the secondary particles is 70 $m^2$/g or more.

A method of physically crushing the aggregates of the primary particles of hydroxyapatite is not particularly limited, but examples thereof include a wet-type jet mill method, a ball mill method and the like. The wet-type jet mill method includes steps of spraying a slurry under high pressure to obtain droplets of the slurry and crashing the droplets to each other. The ball mill method includes steps of placing the slurry into a closed vessel with spherical objects constituted of ceramics such as zirconia and rotating the closed vessel. Among them, it is preferred that the wet-type jet mill method is used.

Here, the wet-type jet mill method is a method as follows: First, high pressure is added to the slurry in which the aggregates of the primary particles of hydroxyapatite are dispersed. Next, by spraying the slurry, the slurry is introduced into an opposing crash chamber, a ball crash chamber or a single nozzle chamber in a state of droplets of the slurry. By doing so, the droplets of the slurry are crashed to each other to crush the aggregates.

According to the method, the aggregates of the primary particles of hydroxyapatite are crushed reliably. Therefore, it is possible to reliably obtain powder (secondary particles) of hydroxyapatite which will be obtained in a later step [S3] so that the bulk density of the powder is 0.65 g/mL or more and the specific surface area of the secondary particles is 70 $m^2$/g or more.

An average particle size of the crushed aggregates is preferably 1 μm or less and more preferably in the range of about 0.1 to 0.6 μm. By falling the average particle size of the crushed aggregates within such a range, it is possible to reliably fall the bulk density of the powder (secondary particles) of hydroxyapatite which will be obtained in the later step [S3] and the specific surface area of the secondary particles within the ranges.

In this regard, a method of adding a surfactant or a dispersant to disperse the primary particles into the slurry may be used as the method of dispersing the primary particles into the slurry other than the method of physically crushing the aggregates of the primary particles as this embodiment. However, in the former method (method of adding the surfactant or the dispersant), the added surfactant or dispersant remains in the powder of hydroxyapatite during a step of drying the slurry in the later step [S3]. Therefore, in order to remove them, it is needed that the powder of hydroxyapatite is sintered at a temperature of 800° C. or higher. When the powder is sintered at such a temperature, a specific surface area of the particles of the powder is lowered. Therefore, it is substantially impossible for the former method to set the specific surface area of the particles to 70 m²/g or more as the powder of the present invention.

[S3: Step of Obtaining Powder of Hydroxyapatite by Drying Slurry (Third Step)]

In this step, the slurry containing the aggregates crushed and obtained in the above step [S2] is dried and then the crushed aggregates is granulated, so that powder (dried powder) mainly constituted from the secondary particles of hydroxyapatite is obtained.

In the present invention, the aggregates in which the primary particles of hydroxyapatite are aggregated are crushed to obtain aggregates of a small size in the above step [S2]. Therefore, in the powder of hydroxyapatite obtained in the present step [S3], a bulk density thereof becomes 0.65 g/mL or more and a specific surface area of the particles becomes 70 m²/g or more.

A method of drying the slurry is not particularly limited to a specific method, but a spray drying method is preferably used. According to such a method, it is possible to reliably obtain powder including particles having a predetermined particle size for a short period of time by granulating the crushed aggregates.

Further, a drying temperature of the slurry is preferably in the range of about 75 to 250° C. and more preferably in the range of about 95 to 220° C. By setting the drying temperature to a value within the above range, it is possible to obtain powder which has a high bulk density and the secondary particles having a large specific surface area.

The method of producing the powder according to the present embodiment, in particular, is suitable to produce powder containing particles having an intended particle size in the range of about 2 to 100 μm (in particular, about 3 to 10 μm).

In this regard, it is to be noted that such powder (dried powder) can be sintered to obtain sintered powder. This makes it possible to improve compressive particle strength (breaking strength) of the particles of the powder (sintered powder).

In this case, a sintering temperature of the powder is preferably in the range of about 200 to 900° C. and more preferably in the range of about 400 to 700° C.

By completing the steps as described above, it is possible to obtain powder constituted of the secondary particles of hydroxyapatite (synthetic material).

Although the powder, the method of producing the powder and the adsorption apparatus according to the present invention have been described above, the present invention is not limited thereto.

For example, the method of producing the powder according to the present invention may further include a pre-step before the step [S1], an intermediate step between the step [S1] and the step [S2] or between the step [S2] and the step [S3], and a post-step after the step [S3] for any purpose.

EXAMPLES

Next, the present invention will be described with reference to actual examples.

1. Production of Hydroxyapatite Having Particle Size of 40 μm

Example 1

[1A] First, calcium hydroxide of 2400 g was dispersed in pure water of 60 L to obtain a calcium hydroxide dispersion liquid. Then, the calcium hydroxide dispersion liquid was added into a tank. An phosphoric acid aqueous solution (phosphoric acid concentration is 85 wt %) of 4 L was dropped into the calcium hydroxide dispersion liquid at a speed of 1 L/hr while the calcium hydroxide dispersion liquid was stirred in the tank. As a result, was obtained a slurry containing aggregates in which primary particles of hydroxyapatite of 10 wt % were aggregated.

In this regard, it is to be noted that an ambient temperature during the dropping process was set to normal temperature (25° C.).

Furthermore, a stirring power of the slurry in which the phosphoric acid aqueous solution was dropped into the calcium hydroxide dispersion liquid was set to 1.7 W with respect to 1 L of the slurry.

[2A] Next, the aggregates contained in the obtained slurry were crushed under high pressure of 200 MPa by using a wet-type jet mill apparatus ("StarBurst" produced by SUGINO MACHINE LIMITED), to thereby obtain a slurry containing the crushed aggregates.

A particle size distribution curve of each of the aggregates contained in the slurry before crushing and the aggregates contained in the slurry after crushing was measured by using a particle size distribution analyzer ("MT3300" produced by Microtrac).

Figure 2A:
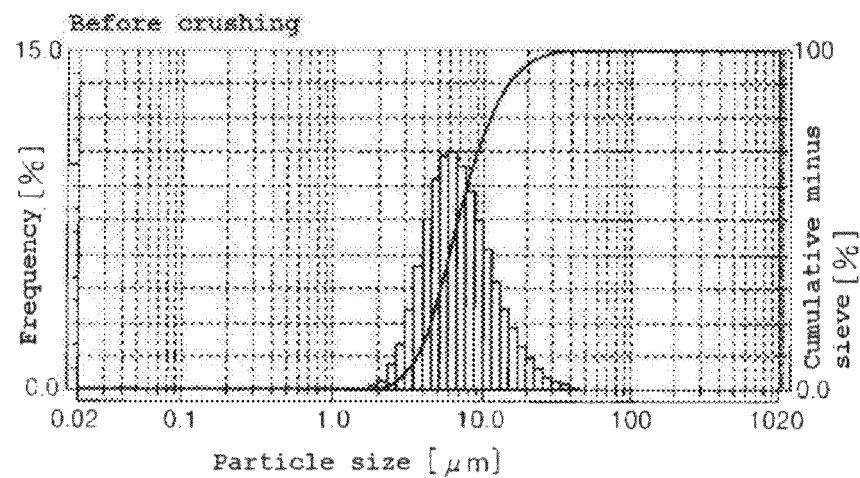
FIGS. 2(a) and (2b) show particle size distribution curves of aggregates contained in a slurry.
Figure 2B:
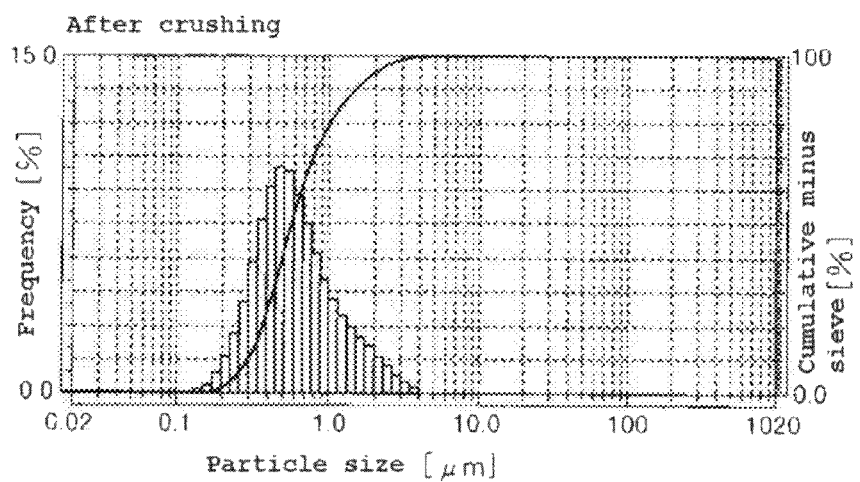
FIG. 2(b) shows a particle size distribution curve of the aggregates after crushing.

The results are shown in FIG. 2(a) and FIG. 2(b).

As clearly shown from FIG. 2(b), the aggregates contained in the slurry could be crushed by using the wet-type jet mill apparatus. Concretely, it found that the aggregates could be crushed by an average particle size of 0.74 μm.

[3A] Next, the slurry containing the crushed aggregates was spray-dried at a temperature of 210° C. using a spray drier ("MAD-6737R" manufactured by MATSUBO Corporation) to thereby granulate hydroxyapatite contained in the slurry. In this way, particulate secondary particles (dried powder) were obtained. Thereafter, the thus obtained secondary particles (dried powder) (hydroxyapatite powder) were classified by using a cyclone classifier ("TC-15" produced by NISSHIN ENGINEERING INC.) to obtain particles having a median particle size of about 40 μm.

In this regard, it is to be noted that the thus obtained powder (secondary particles) was confirmed to be hydroxyapatite by a powder X-ray diffractometry.

[4A] Next, a part of the classified dried powder (secondary particles) was sintered at sintering temperatures of 400° C. and 700° C. to obtain sintered powders.

Comparative Example 1

Secondary particles of hydroxyapatite having a median particle size of about 40 μm (dried powder) and sintered powders thereof were obtained in the same manner as in the Example 1, except that the above step [2A], namely the step of crushing the aggregates contained in the slurry was omitted.

2. Evaluation of Hydroxyapatite Having Particle Size of 40 μm 2-1. Evaluation of Bulk Densities of Dried Powder and Sintered Powders Each of the dried powders (secondary particles) and the sintered powders sintered at the sintering temperatures of 400° C. and 700° C., which were obtained in the Example 1 and the Comparative Example 1, were filled into a stainless tube of 1.256 mL by tapping it 100 times. Then, their bulk densities were obtained by measuring their filling amounts, respectively.

The results are shown in Table 1.

TABLE 1

Table 1

| | Bulk densities [g/mL] | | |
|---|---|---|---|
| | Dried powder | Sintered particles (400° C.) | Sintered particles (700° C.) |
| Ex. 1 | 0.70 | 0.70 | 0.70 |
| Com. Ex. 1 | 0.63 | 0.63 | 0.63 |

As clearly seen from Table 1, the bulk densities of the dried powder and the sintered powders obtained in the Example 1 were improved by about 10% as compared with the bulk densities of the dried powder and the sintered powders obtained in the Comparative Example 1. From these results, it is considered that not only gaps in the particle of the formed dried powder but also gaps in the particle of the formed sintered powders became small by crushing the aggregates of their primary particles contained in the slurry, so that a filling density in the tube became high.

2-2. Evaluation of Specific Surface Areas of Particles of Dried Powder and Sintered Powders Each of the dried powders (secondary particles) and the sintered powders sintered at the sintering temperatures of 400° C. and 700° C., which were obtained in the Example 1 and the Comparative Example 1, were subjected to an automatic BET specific surface area analyzer ("Macsorb HM1201" produced by Mountech Co., Ltd) to obtain a specific surface area of the particles thereof.

The results are shown in Table 2.

TABLE 2

Table 2

| | Specific surface areas [m$^2$/g] | | |
|---|---|---|---|
| | Dried powder | Sintered particles (400° C.) | Sintered particles (700° C.) |
| Ex. 1 | 75 | 52 | 25 |
| Com. Ex. 1 | 60 | 40 | 20 |

As clearly seen from Table 2, the specific surface areas of the particles of the dried powder and the sintered powders obtained in the Example 1 were improved as compared with the specific surface areas of the particles of the dried powder and the sintered powders obtained in the Comparative Example 1. This tendency, in particular, was confirmed conspicuously in the dried powder.

Generally, if conditions of surfaces of particles are identical to each other, is shown a tendency that a specific surface area of particles of powder having a high bulk density is smaller than that of particles of powder having a low bulk density. However, as shown in the above item "2-1. Evaluation of Bulk Densities", both the bulk densities and the specific surface areas of the dried powder and the sintered powders obtained in the Example 1 were improved as compared with the bulk densities and the specific surface areas of the dried powder and the sintered powders obtained in the Comparative Example 1. From these results, it is considered that fine pores are formed in the surfaces of the particles of the dried powder and the sintered powders obtained in the Example 1 or their surfaces are irregularity formed due to the crush of the aggregates of their primary particles contained in the slurry. As a result, it is considered that the specific surface areas of the particles of their powders are also improved regardless of the improvement of the bulk densities of their powders.

2-3. Evaluation of Sphericities of Particles of Dried Powder and Sintered Powders Each of the dried powders (secondary particles) and the sintered powders sintered at the sintering temperatures of 400° C. and 700° C., which were obtained in the Example 1 and the Comparative Example 1, were subjected to a flow particle image analyzer ("FPIA-3000" produced by SYSMEX CORPORATION) to obtain a sphericity of the particles thereof.

The results are shown in Table 3.

Figure 3:
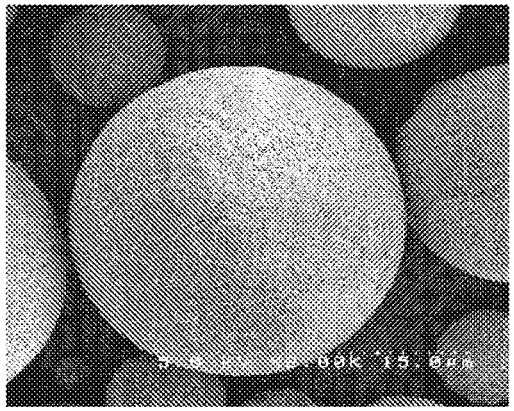
FIG. 3 shows electron microscope photographs of dried powders obtained in Example 1 and Comparative Example 1.
Figure 3:
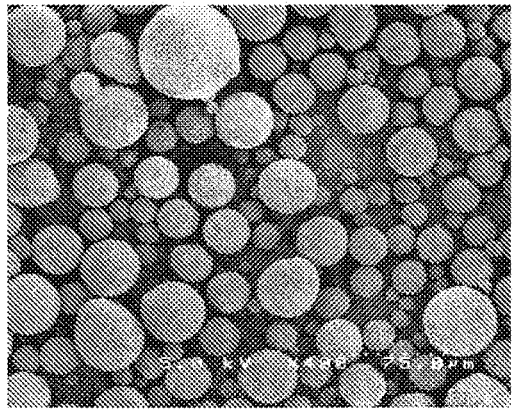
Figure 3:
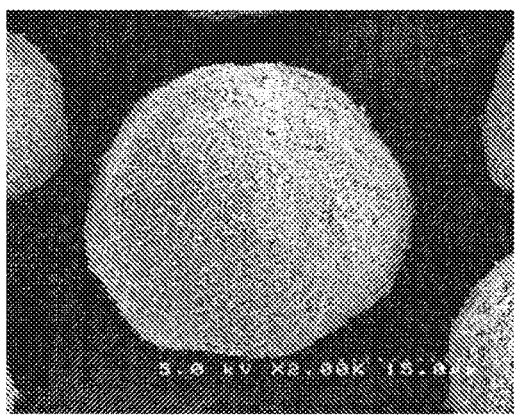
Figure 3:
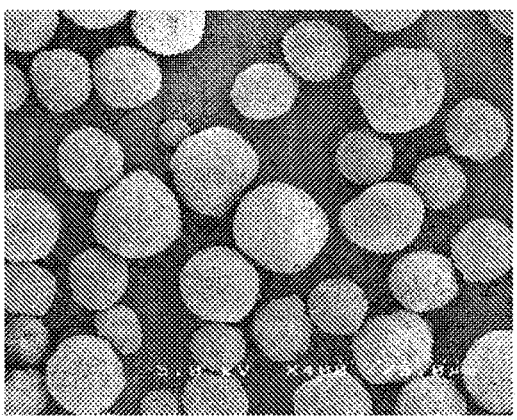

Further, electron microscope photographs of the particles of the dried powders obtained in the Example 1 and the Comparative Example 1 are shown in FIG. 3.

TABLE 3

Table 3

| | Sphericities | | |
|---|---|---|---|
| | Dried powder | Sintered particles (400° C.) | Sintered particles (700° C.) |
| Ex. 1 | 0.97 | 0.97 | 0.97 |
| Com. Ex. 1 | 0.95 | 0.95 | 0.95 |

As clearly seen from Table 3, the sphericities of the particles of the dried powder and the sintered powders obtained in the Example 1 were improved as compared with the sphericities of the particles of the dried powder and the sintered powders obtained in the Comparative Example 1. Further, as clearly seen from the electron microscope photographs in FIG. 3, the sphericity of each particle of the dried powder obtained in the Example 1 was higher than the sphericity of each particle of the dried powder obtained in the Comparative Example 1. In addition to that, each surface of the particles of the dried powder obtained in the Example 1 was smooth.

2-4. Evaluation of Micropores of Surfaces of Particles of Dried Powder and Sintered Powders Electron microscope photographs in the vicinities of the surfaces of the particles of the dried powders obtained in the Example 1 and the Comparative Example 1 are shown in FIG. 4.

Figure 4:
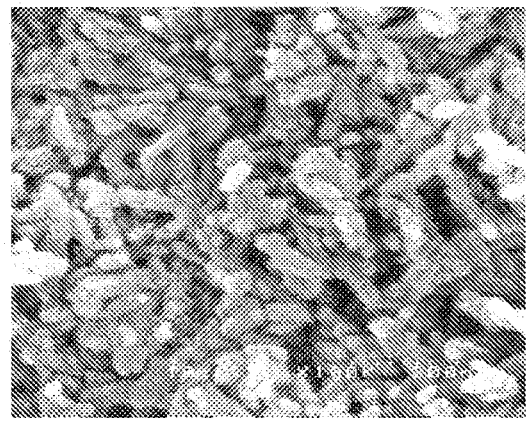
FIG. 4 shows electron microscope photographs in the vicinities of surfaces of particles of dried powders obtained in Example 1 and Comparative Example 1.
Figure 4:
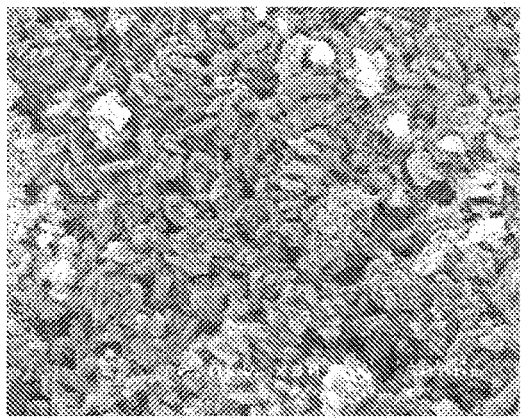
Figure 4:
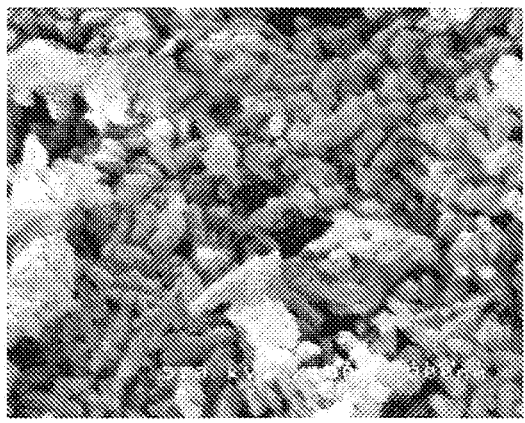
Figure 4:
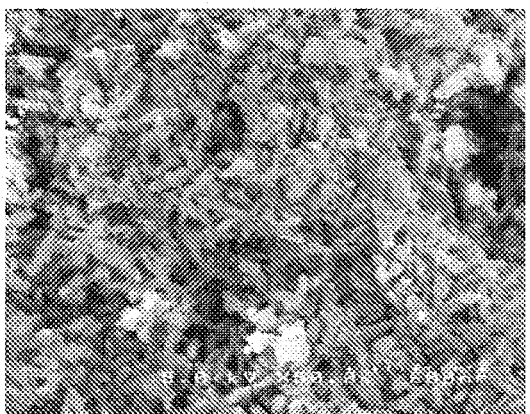

As clearly seen from the electron microscope photographs in FIG. 4, it found that the surfaces of the particles of the dried powder obtained in the Comparative Example 1 were uneven. Further, sizes of the micropores, which were formed by vaporization of water during the step of spray drying, were non-uniform. In contrast, the surfaces of the particles of the dried powder obtained in the Example 1 were smooth.

In addition to that, the micropores having substantially an uniform size were distributed uniformly.

Each of the sintered powders sintered at the sintering temperatures of 400° C. and 700° C. and obtained in the Example 1 and the Comparative Example 1 was subjected to a pore size analyzer ("Micromeritics AutoPore 9200" produced by Shimadzu Corporation). Then, micropore distribution curves in the surfaces of the particles of each of the sintered powders were measured by using a mercury intrusion technique.

Figure 5A:
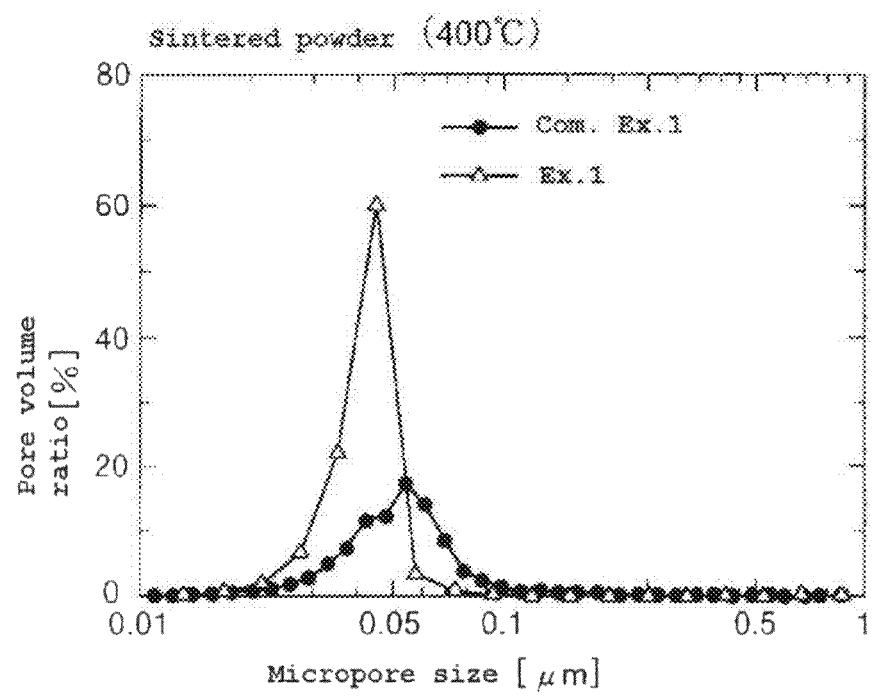
FIGS. 5(a) and 5(b) show micropore distribution curves in surfaces of particles of sintered powders obtained in Example 1 and Comparative Example 1.
Figure 5B:
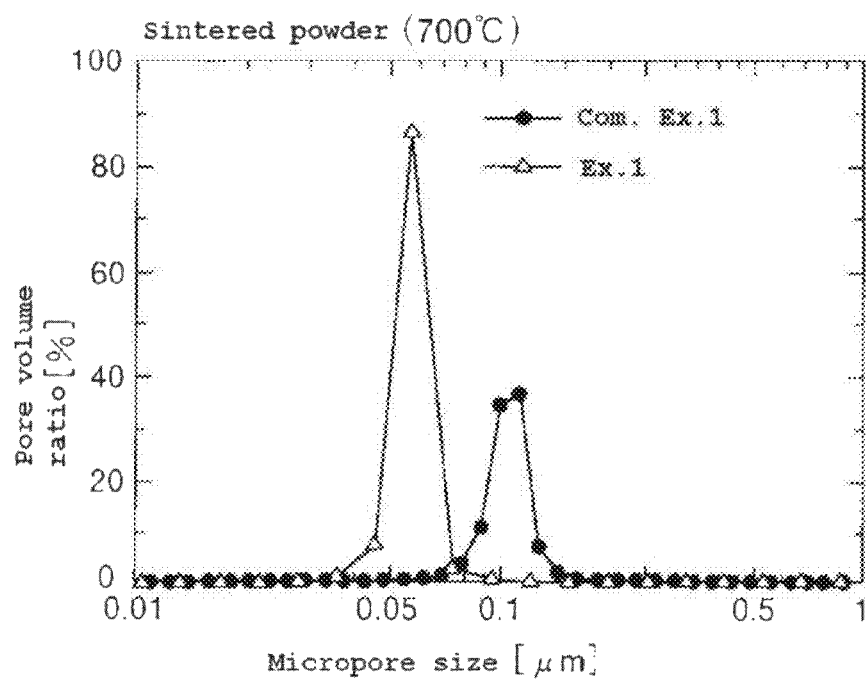

The results are shown in FIG. 5.

As clearly seen from FIG. 5, it found that the sizes of the micropores in the surfaces of the particles of the sintered powders obtained in the Example 1 were uniform and small as compared with those in the surfaces of the particles of the sintered powders obtained in the Comparative Example 1.

2-5. Evaluation of Repose Angles of Dried Powder and Sintered Powders

Each of the dried powders (secondary particles) and the sintered powders sintered at the sintering temperatures of 400° C. and 700° C., which were obtained in the Example 1 and the Comparative Example 1, were subjected to a multi tester ("MT-1001" produced by SEISHIN ENTERPRISE CO., LTD.) to obtain repose angles of the powders.

The results are shown in Table 4.

TABLE 4

Table 4

| | Repose angles [°] | | |
|---|---|---|---|
| | Dried powder | Sintered particles (400° C.) | Sintered particles (700° C.) |
| Ex. 1 | 26 | 24 | 22 |
| Com. Ex. 1 | 32 | 30 | 28 |

As clearly seen from Table 4, the repose angles of the dried powder and the sintered powders obtained in the Example 1 were lower than those of the dried powder and the sintered powders obtained in the Comparative Example 1. This reflected the results that the sphericities of the particles of the dried powder and the sintered powders obtained in the Example 1 were higher than those of the particles of the dried powder and the sintered powders obtained in the Comparative Example 1, in addition to that, the surfaces of the particles of the dried powder obtained in the Example 1 were smooth in the above item "2-3. Evaluation of Sphericities of Particles".

2-6. Evaluation of Compressive Particle Strengths of Particles of Dried Powder and Sintered Powders Each of the dried powders (secondary particles) and the sintered powders sintered at the sintering temperatures of 400° C. and 700° C., which were obtained in the Example 1 and the Comparative Example 1, were subjected to a compression testing machine ("MCT-W200-J" manufactured by Shimadzu Corporation) to obtain compressive particle strengths of the particles thereof.

The results are shown in Table 5.

TABLE 5

Table 5

| | Compressive particle strengths [MPa] | | |
|---|---|---|---|
| | Dried powder | Sintered particles (400° C.) | Sintered particles (700° C.) |
| Ex. 1 | 2.4 | 7.3 | 9.4 |
| Com. Ex. 1 | 2.2 | 3.2 | 2.7 |

As clearly seen from Table 5, the compressive particle strengths of the dried powder and the sintered powders obtained in the Example 1 became higher than those of the dried powder and the sintered powders obtained in the Comparative Example 1. This reflected the results that the bulk densities of the dried powder and the sintered powders obtained in the Example 1 became higher than those of the dried powder and the sintered powders obtained in the Comparative Example 1 in the above item "2-1. Evaluation of Bulk Densities".

2-7. Results

As described above, it found both the bulk densities of the dried powder and the sintered powders to be formed and the specific surface areas of their particles were improved by crushing the aggregates contained in the slurry, thereby lowering the particle size of the aggregates in the above step [2A].

As described above, it found each of the dried powder and the sintered powders obtained in the Example 1 of which bulk densities were improved exhibited (had) superior particle strength to the dried powder and the sintered powders obtained in the Comparative Example 1 from the results of the above item "2-6. Evaluation of Compressive Particle Strengths".

Further, from the data obtained in the above item "2-2. Evaluation of Specific Surface Areas of Particles", a surface area of the particles per 1 mL of a column was obtained. The results are shown in Table 6. The surface areas of the particles of the dried powder and the sintered powders obtained in the Example 1 were about 1.2 to 1.4 times larger than those of the particles of the dried powder and the sintered powders obtained in the Comparative Example 1. In addition to that, amounts of adsorbing materials were also about 1.2 to 1.4 times larger than those of the Comparative Example 1. From the results, it was considered that adsorption properties of the particles of the dried powder and the sintered powders obtained in the Example 1 were improved.

TABLE 6

Table 6

| | Surface areas [mm$^2$/mL] | | |
|---|---|---|---|
| | Dried powder | Sintered particles (400° C.) | Sintered particles (700° C.) |
| Ex. 1 | 75 | 36.4 | 17.0 |
| Com. Ex. 1 | 65 | 25.2 | 12.6 |

Further, the sphericities of the particles of the dried powder and the sintered powders obtained in the Example 1 were higher than those of the particles of the dried powder and the sintered powders obtained in the Comparative Example 1. In addition to that, the surfaces of the particles of the dried powder and the sintered powders obtained in the Example 1 were smooth. Due to the results, the repose angles of the dried powder and the sintered powders obtained in the Example 1 became low. From these results, it is considered that it is possible to improve operability in filling each of the dried powder and the sintered powders obtained in the Example 1 into a filling space of a column.

3. Production of Hydroxyapatite Having Particle Size of 10 μm or Less

Example 2

[1B] First, was obtained a slurry containing aggregates which were formed by aggregating primary particles of hydorxyapatite of 10 wt % in the same manner as in the above step [1A].

[2A] Next, the aggregates contained in the obtained slurry were crushed by using a wet-type jet mill apparatus in the same manner as in the above step [2A]. As a result, a slurry containing the crushed aggregates was obtained.

[2B] Next, the slurry containing the crushed aggregates was spray-dried at a temperature of 110° C. by using a small spray drier ("Mobile Minor Spray Dryer" manufactured by Niro Inc., a spray system is a twin-fluid atomizing system, a tip flow path is 300 μm). Then, hydroxyapatite contained in the slurry was granulated to obtain particulate secondary particles (dried powder).

Comparative Example 2

Secondary particles of hydroxyapatite (dried powder) were obtained in the same manner as in the Example 2, except that the above step [2B], namely the step of crushing the aggregates contained in the slurry was omitted.

4. Evaluation of Hydroxyapatite Having Particle Size of 10 μm or Less

Figure 6:
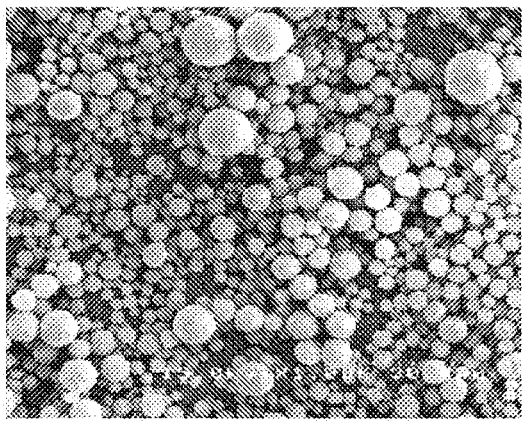
FIG. 6 shows electron microscope photographs of dried powders obtained in Example 2 and Comparative Example 2.
Figure 6:
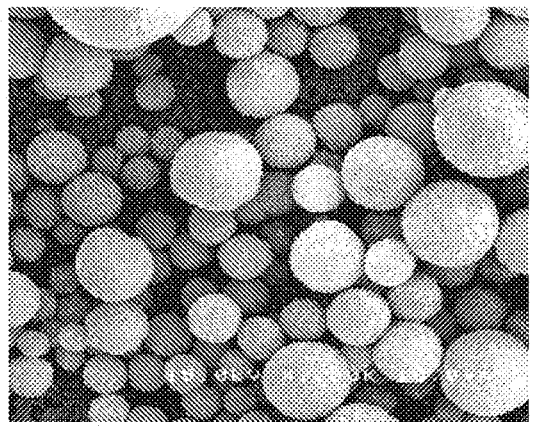
Figure 6:
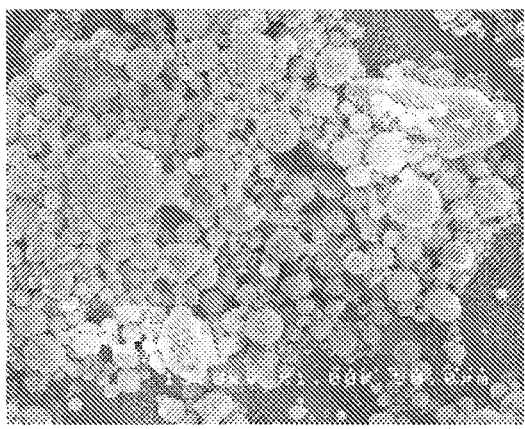
Figure 6:
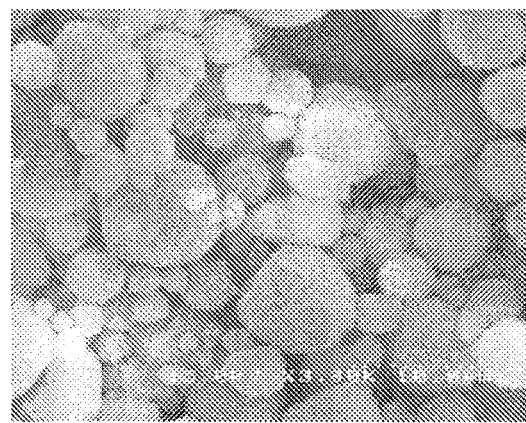

Electron microscope photographs of the dried powders obtained in the Example 2 and the Comparative Example 2 are shown in FIG. 6.

Figure 7:
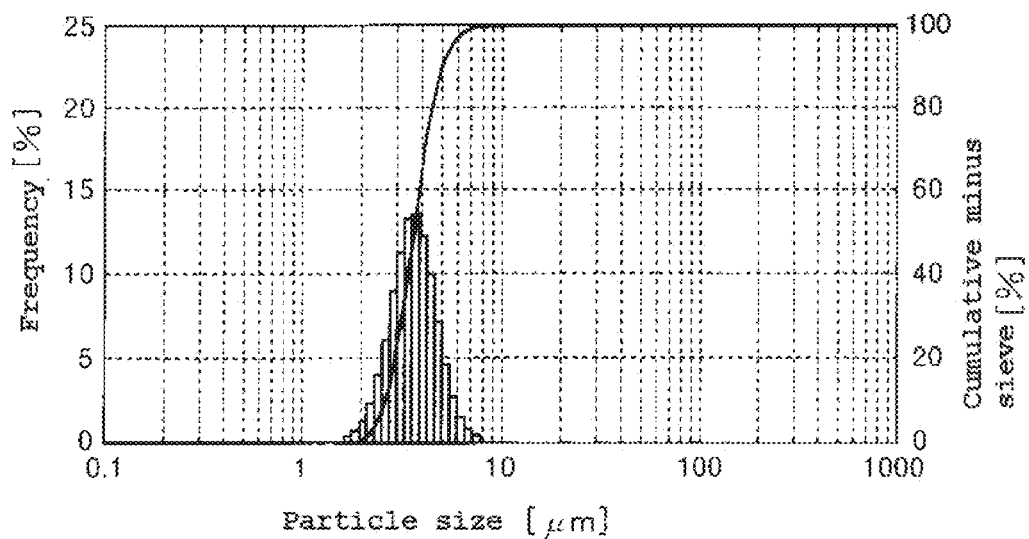
FIG. 7 shows a particle size distribution curve of particles of dried powder obtained in Example 2.

The dried powder obtained in the Example 2 had particles having a high sphericity and had a particle size distribution curve as shown in FIG. 7. In addition to that, it was not confirmed that particles having a large particle size of 30 μm or larger were mixed in the dried powder obtained in the Example 2.

In contrast, the sphericity of the particles of the dried powder obtained in the Comparative Example 2 was clearly lower than that of the particles of the dried powder obtained in the Example 2. Furthermore, many particles having the particle size of 30 μm or larger were mixed in the dried powder obtained in the Comparative Example 2. That is, it was difficult to obtain particles having the particle size of 10 μm or less because the aggregates in themselves were aggregated in a particle size of a few dozen μm.

From the reasons described above, it found that it is possible to form even the dried powder (secondary particles) of the particles of the hydroxyapatite having the particle size of 10 μm or less with the high sphericity and the uniform particle size by crushing the aggregates contained in the slurry to lower the particle size of the aggregates in the above step [2B].

INDUSTRIAL APPLICABILITY

The powder according to the present invention is mainly constituted from the secondary particles of the hydroxyapatite obtained by drying slurry containing the primary particles of the hydroxyapatite and the aggregates thereof, and then granulating the primary particles and the aggregates. The bulk density of the powder is 0.65 g/mL or more and the specific surface area of the secondary particles is 70 m$^2$/g or more. Therefore, the powder according to the present invention has the high strength and is capable of exhibiting the excellent adsorption capability when it is used for the adsorbent the adsorption apparatus has. Accordingly, the powder according to the present invention has industrial applicability.

What is claimed is:

1. A powder comprising mainly hydroxyapatite, wherein the powder is obtained by preparing a slurry containing primary particles of the hydroxyapatite and aggregates thereof, physically crushing the aggregates in the slurry, drying the slurry containing the primary particles of the hydroxyapatite and the crushed aggregates thereof, granulating the dried slurry to obtain granulated particles and sintering the granulated particles at a sintering temperature, and wherein the powder has a bulk density of about 0.65 g/mL or more and a specific surface area of about 25 m$^2$/g to about 52 m$^2$/g.

2. The powder as claimed in claim 1, wherein the sintering temperature is in the range of about 200° C. to 900° C.

3. The powder as claimed in claim 1, wherein the physically crushing is performed such that the powder has a specific surface area of about 1.2 to about 1.4 times larger than those of particles of the dried powder and the sintered powders obtained without said physically crushing of the aggregates in the slurry.

4. An adsorption apparatus provided with the powder defined in claim 1 as an adsorbent.

* * * * *